United States Patent
Heinrich et al.

(10) Patent No.: US 12,422,809 B2
(45) Date of Patent: Sep. 23, 2025

(54) FAN ENHANCEMENTS TO IMPROVE SERVER PERFORMANCE AND QUALITY

(71) Applicant: Hewlett Packard Enterprise Development LP, Houston, TX (US)

(72) Inventors: David F. Heinrich, Tomball, TX (US); Pranay Mahendra, Tomball, TX (US); Stephen Robert Jones, Cypress, TX (US); Gennadiy Rozenberg, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 778 days.

(21) Appl. No.: 17/580,398

(22) Filed: Jan. 20, 2022

(65) Prior Publication Data

US 2023/0229132 A1    Jul. 20, 2023

(51) Int. Cl.
G05B 19/045 (2006.01)
G01R 21/133 (2006.01)
G06F 21/44 (2013.01)

(52) U.S. Cl.
CPC ......... *G05B 19/045* (2013.01); *G01R 21/133* (2013.01); *G06F 21/44* (2013.01); *G05B 2219/25257* (2013.01)

(58) Field of Classification Search
CPC ........ G05B 19/045; G05B 2219/25257; G01R 21/133; G06F 21/44; F04D 25/08; F04D 27/001; H04L 67/125
See application file for complete search history.

(56) References Cited

U.S. PATENT DOCUMENTS 7,343,505 B2 *  3/2008  Chotoku ............... G06F 1/206
                                                                700/202
9,891,682 B1 *  2/2018  Czamara ............... G06F 1/266
(Continued)

FOREIGN PATENT DOCUMENTS

CN      104598365 A      5/2015
CN      208607606 U      3/2019

OTHER PUBLICATIONS

SMSC Success by Design EMC 201. "EMC 2101", 2009, pp. 57, downloaded from chrome-extension://efaidnbmnn-nibpcajpcglclefindmkaj/https://ww1.microchip.com/downloads/en/DeviceDoc/2101.pdf (Year: 2009).*

*Primary Examiner* — Robert E Fennema
*Assistant Examiner* — Olvin Lopez Alvarez
(74) *Attorney, Agent, or Firm* — Park, Vaughan, Fleming & Dowler LLP

(57) ABSTRACT

A system is provided, which manages, by a microcontroller internal to a fan installed in a server, power data associated with the fan, wherein the fan includes two pins configured to communicate signals based on an inter-integrated circuit (I2C). During operation of the fan, the microcontroller measures a first and second amount of power consumed by the fan at a first and second time. The microcontroller transmits, via the two pins, the information to a system management entity which monitors and manages the server, wherein the system management entity controls a speed of the fan in response to receiving the measured power data and based on a net power comprising a difference between a total amount of power consumed by the server and an amount of power consumed by the fan.

20 Claims, 8 Drawing Sheets

(56) References Cited

U.S. PATENT DOCUMENTS

| | | | |
|---|---|---|---|
| 2008/0310967 A1* | 12/2008 | Franz | F04D 27/008 |
| | | | 318/434 |
| 2010/0023787 A1 | 1/2010 | Ho et al. | |
| 2011/0231030 A1* | 9/2011 | Carter | G06F 1/324 |
| | | | 713/320 |
| 2012/0323400 A1* | 12/2012 | Sankar | G05D 23/1919 |
| | | | 700/300 |
| 2013/0037250 A1 | 2/2013 | Franz et al. | |
| 2013/0063126 A1* | 3/2013 | Cong | G06F 11/3041 |
| | | | 324/76.11 |
| 2014/0095864 A1* | 4/2014 | Dasgupta | H04L 63/0884 |
| | | | 380/279 |
| 2014/0211353 A1* | 7/2014 | Lai | H02P 29/0241 |
| | | | 361/91.5 |
| 2018/0132382 A1* | 5/2018 | Baran | H05K 7/20145 |
| 2018/0255458 A1* | 9/2018 | Villar | G06F 21/44 |
| 2020/0089290 A1* | 3/2020 | Heinrich | H02P 29/20 |
| 2020/0264575 A1* | 8/2020 | Hsu | G05B 19/042 |
| 2023/0127216 A1* | 4/2023 | He | H05K 7/20836 |
| | | | 700/300 |

* cited by examiner

| PIN POSITION 202 | PIN FUNCTION 204 |
|---|---|
| 1 | FAN POSITIVE POWER (OUTLET), 12V |
| 2 | FAN POSITIVE POWER (INLET), 12V |
| 3 | I2C |
| 4 | I2C |
| 5 | FAN_INSTALL |
| 6 | PWM SIGNAL |
| 7 | FAN POWER RETURN (INLET), GROUND |
| 8 | FAN POWER RETURN (OUTLET), GROUND |

FAN ENHANCEMENTS TO IMPROVE SERVER PERFORMANCE AND QUALITY

BACKGROUND

Field

This disclosure is generally related to the field of server management. More specifically, this disclosure is related to a method and system for facilitating fan enhancements to improve server performance and quality.

BRIEF DESCRIPTION OF THE FIGURES

In the figures, like reference numerals refer to the same figure elements.

DETAILED DESCRIPTION

Figure 1A:
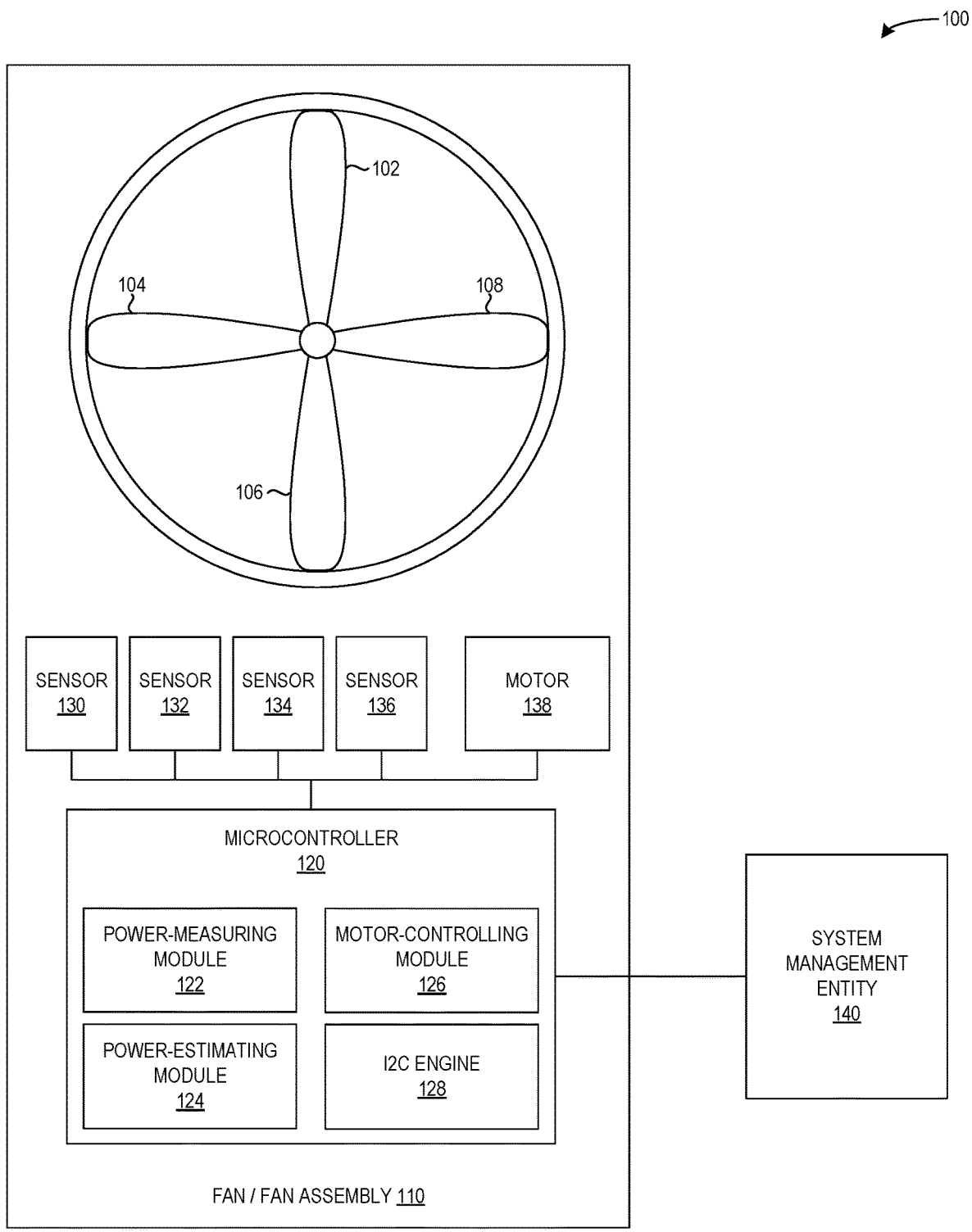
FIG. 1A illustrates a diagram with a fan or fan assembly, including a microcontroller internal to the fan or fan assembly, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

A computing device (e.g., a server) and its components can release heat during operation. The server may include one or more fans to ensure efficient and proper operation of the server, e.g., to prevent overheating and failure of the components. Thus, efficiently controlling the fan speed in a server can result in more efficient server performance and quality.

Furthermore, once a fan has shipped from a factory, it may be difficult to remotely ascertain "fan information," including: fan manufacture/type information relating to, e.g., the manufacturer, a serial number, a lot number, a date of manufacture, a type of the fan, and a vendor; and power information or power data related to the operation of the fan. As a result, remote fan management which can both obtain the fan information and control the fan speed may be desirable and can improve the performance and quality of a server.

One solution can involve using a microcontroller on a board external to the fan itself, where the microcontroller communicates with an infrastructure controller. However, physical space inside a server can be limited, and adding additional components to manage the fan in this manner may not be feasible. Another solution can involve using the upper range of a pulse width modulation (PWM) signal detected via one pin and sending messages via a default signal on another pin. However, this solution can result in a reduction in the uppermost portion of the fan speed.

The described aspects of the present application provide a fan with a microcontroller which is internal to, resides within, and is inside the fan itself and allows use of the entirety of the fan speed range, in contrast to the current solutions. The described microcontroller can store and manage fan information, including power data associated with operation of the fan and the type/manufacture of the fan, as well as telemetry information associated with operation of the fan. This fan-internal microcontroller can transmit the information over an Inter-Integrated Circuit (I2C) to an external system management entity (e.g., a baseboard management controller (BMC) or a complex programmable logic device (CPLD)), through the use of two fan connector pins, thus requiring neither the use of any additional real estate in the server itself nor any reserved portion of the fan speed range for transmitting signals. The aspects of the described fan-internal microcontroller can thus readily and efficiently transmit information to the external system management entity, where the fan resides in a server which is installed in an independent rack or tower server.

In general, I2C is a type of serial computer bus and communications protocol which allows multiple electronic devices (e.g., peripheral integrated circuits) to communicate with each other over a single pair of wires. I2C can use two bi-directional open-drain lines for communication, including a serial data line (SDL) for transferring data and a serial clock line (SCL) which carries the clock signal. Two pins on a connector may be used to carry the I2C signals, as described below in the exemplary fan connector pinout of FIG. 2.

The terms "system" and "computer system" are used interchangeably in this disclosure and can refer to a set of integrated devices or components which input, output, process, and store data. A system or computer system can include hardware components, e.g.: processors, microcontrollers, volatile memory such as dynamic random access memory (DRAM), non-volatile memory, and peripheral devices. A system or computer system can also include software components or modules, as described below in relation to FIG. 5. The term "system management entity" can refer to an entity, in software or hardware, which provides management and control operations for components of a system or computer system.

The terms "fan" and "fan assembly" are used interchangeably in this disclosure and refer to a unit which can include blades, sensors, pins, and a microcontroller internal to the fan, where the microcontroller handles communications via two pins based on I2C with an external system management entity, as described below in relation to elements 110, 150, and 160 of, respectively, FIGS. 1A, 1B, and 1C.

FIG. 1A illustrates a diagram 100 of a fan or fan assembly 110, including a microcontroller 120 internal to fan or fan assembly 110, in accordance with an aspect of the present application. Fan or fan assembly 110 can include: fan blades 102, 104, 106, and 108; a plurality of sensors 130, 132, 134, and 136; a motor 138; and fan-internal microcontroller 120. Fan or fan assembly 110 can include a greater or lesser number of blades and sensors than those depicted in FIG. 1A. Sensors 130-136 can include sensors which are configured to obtain data associated with operation of the fan relating to, e.g.: current; voltage; temperature; and rotations per minute (e.g., a tachometer or other similar device).

Microcontroller 120 can include: a power-estimating module 122; a power-measuring module 124; a motor-controlling module 126 for controlling motor 138; and an I2C engine 128. Microcontroller 120 can store and manage information associated with the fan, including: manufacturing information associated with the fan, such as a manufacturer, manufacture date, serial number, and vendor number; a type of the fan, such as whether the fan is a standard fan, a performance fan, or another type of fan; and power data associated with the fan during operation.

Furthermore, using data obtained from sensors 130-136, microcontroller 120 can measure the power consumed by fan 110 (i.e., the power data). Power-measuring module 122 can use the obtained data to measure the power consumed by fan 110 during operation, e.g., for a certain period of time, at two different time intervals, or at periodic or predetermined time intervals, etc. Power-estimating module 124 can use additional information, such as fan speed, electronically commutated voltages, rotations per minute, and an amount of back pressure, to estimate the amount of power consumed by fan 110 during operation, again at various time intervals. In some aspects, the operations performed by modules 122 and 124 may be performed by a single module, unit, or component of microcontroller 120. The power measured or estimated by modules 122 and 124 can be referred to as the "power data" of the fan.

Microcontroller 120 can transmit the power data of the fan to an external system management entity 140, e.g., a baseboard management controller (BMC) or a complex programmable logic device (CPLD), via two pins on a fan connector based on I2C, as described below in relation to FIG. 2. BMC/CPLD 140 can control a speed of the fan in response to receiving the measured or estimated power data. For example, if the received power data includes an amount of power consumed by the fan at a first time and a second time, BMC/CPLD 140 can calculate an amount of net power used by the system components (e.g., processors, memory, and peripheral devices of a computer system), excluding the power consumed by the fan, at the first time and the second time, by: determining a difference between a total amount of power consumed by the server at the first time and the amount of power consumed by the fan at the first time to obtain a "first net power"; and determining a difference between a total a total amount of power consumed by the server at the second time and the amount of power consumed by the fan at the second time to obtain a "second net power." BMC/CPLD 140 can compare the first net power with the second net power.

If the second net power is greater than the first net power by more than a predetermined amount (e.g., a certain increase in power consumption by the system excluding the fan over the period of time between the first time and the second time), BMC/CPLD 140 can transmit, via two pins defined for I2C, a signal to microcontroller 120 to increase a current speed of the fan by a certain amount or a first value. This certain amount or first value can be based on an algorithm for controlling speed based on power, e.g., a linear ramp.

If the second net power is not greater than the first net power by more than the predetermined amount (e.g., no increase or a small increase in power consumption by the system excluding the fan over the period of time between the first time and the second time), BMC/CPLD 140 can refrain from sending the signal to microcontroller 120, which can result in maintaining the current speed of the fan.

In some aspects, if the second net power is less than the first net power by another predetermined amount (i.e., a certain decrease in power consumption by the system excluding the fan over the period of time between the first time and the second time), BMC/CPLD 140 can send a signal to microcontroller 120 to decrease the speed of the fan, e.g., by a certain amount or a second value. As with the certain amount or first value by which to increase the fan speed responsive to determining an increase in the net power, this certain amount or second value can be based on a previously determined algorithm. Communications between microcontroller 120 and system management entity 140 are further described below in relation to FIGS. 3A and 3B.

Aspects of the described fan-internal microcontroller 120 can be coupled to a fan connector with, e.g., an 8-pin pinout as described below in relation to FIG. 2, in which two pins can be unique dedicated to or defined for I2C communications. The fan connector can be coupled to the system management entity (e.g., BMC/CPLD, or, in some configurations, a separate BMC and CPLD). In some aspects, the system can use an autonomous engine such as a CPLD to gather the fan information, including the power data. The CPLD can be separate from and independent of the BMC and can be configured by the system.

Thus, by measuring or estimating the power consumed by the fan using the fan-internal microcontroller 120 (i.e., obtaining the power data) and subsequently transmitting the power data to the BMC/CPLD 140 over I2C via defined or dedicated pins, the described aspects can provide enhancements which result in improvements to the performance and quality of a server in which the fan is installed.

Figure 1B:
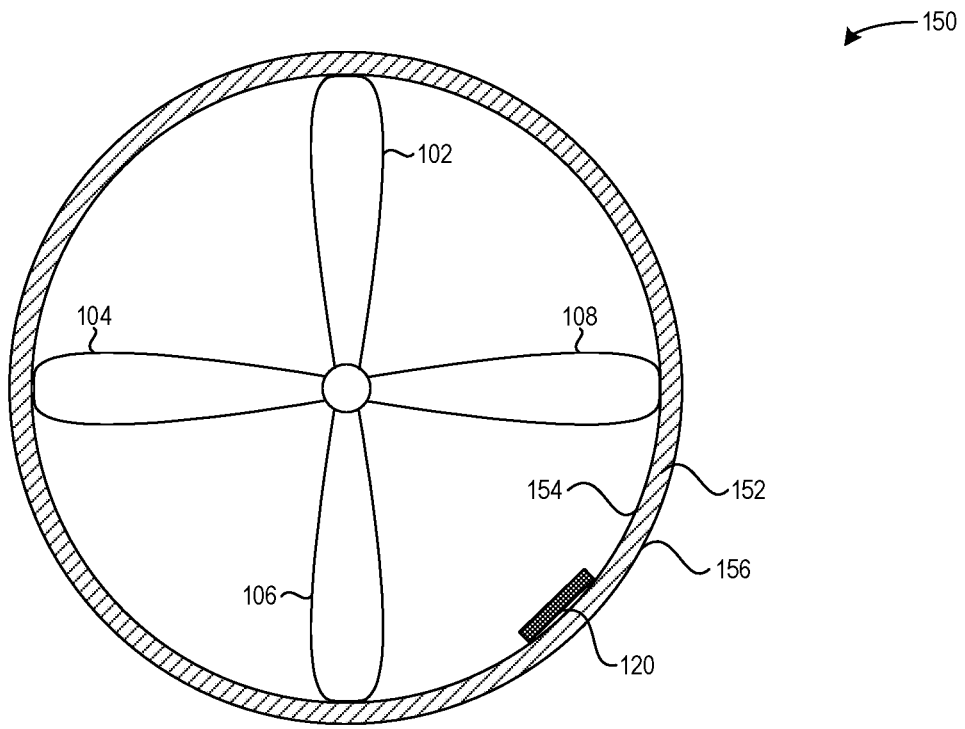
FIG. 1B illustrates a fan or fan assembly, including a microcontroller internal to the fan or fan assembly, in accordance with an aspect of the present application.

FIG. 1B illustrates a fan or fan assembly 150, including microcontroller 120 internal to the fan or fan assembly 150, in accordance with an aspect of the present application. In FIG. 1B, fan assembly 150 can represent a cross-sectional view of the fan or fan assembly. Fan assembly 150 can include a housing or outer casing 152 within which fan blades 102, 104, 106, and 108 can be situated and also within which microcontroller 120 can reside (i.e., as a fan-internal microcontroller). Housing or casing 152 can include an internal side 154 and an external side 156, relative to fan blades 102-108. That is, internal side 154 of housing or casing 152 can face the direction of the location of fan blades 102-108 or be associated with an inside surface of housing or casing 152, and external side 156 of housing or casing 152 can face away from the direction of fan blades 102-108 or be associated with an outside surface of housing or casing 152.

Figure 1C:
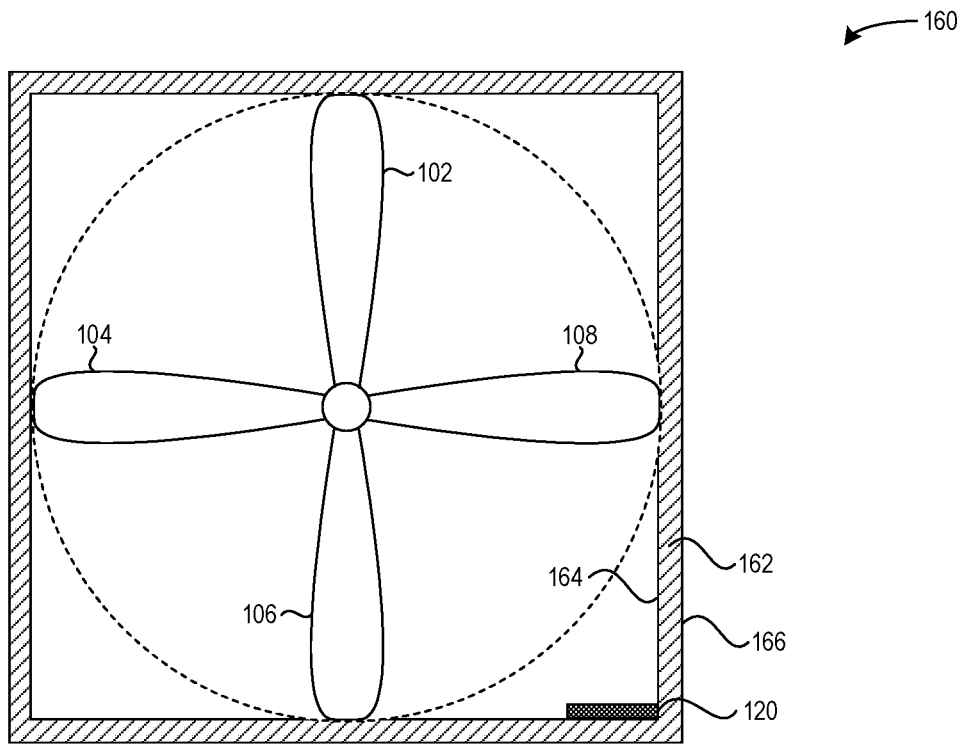
FIG. 1C illustrates a fan or fan assembly, including a microcontroller internal to the fan or fan assembly, in accordance with an aspect of the present application.

FIG. 1C illustrates a fan or fan assembly 160, including microcontroller 120 internal to the fan or fan assembly 160, in accordance with an aspect of the present application. In FIG. 1C, fan assembly 160 can represent a cross-sectional view of the fan or fan assembly. Fan assembly 160 can include a housing or outer casing 162 within which fan blades 102, 104, 106, and 108 can be situated and also within which microcontroller 120 can reside (i.e., as a fan-internal microcontroller). Housing or casing 162 can include an internal side 164 and an external side 166, relative to fan blades 102-108. That is, internal side 164 of housing or casing 162 can face the direction of the location of fan blades 102-108 or be associated with an inside surface of housing or casing 162, and external side 166 of housing or casing 162 can face away from the direction of fan blades 102-108 or be associated with an outside surface of housing or casing 162.

FIGS. 1B and 1C depict housing or casing 152 as closed and circular in the cross-sectional view and further depict housing or casing 162 as closed and square in the cross-sectional view, where the fan-internal microcontroller resides within the housing or casing of the fan assembly itself and on the inside surface closest to and which faces fan blades 102-108. In some aspects, the housing or casing which surrounds fan blades 102-108 may take other shapes or forms, including partially closed, with openings, or multiple sides such as an oval, a rectangle, a triangle, a polygon, or other shape or form, where these other shapes or forms can include an internal side and an external side in relation to fan blades 102-108. Microcontroller 120 can be located within an enclosure or space formed by such a housing or casing, e.g., attached to, touching, coupled to, on the internal side of the housing or casing, or closer to the internal surface of the housing or casing than the external surface of the housing or casing.

By placing microcontroller 120 inside the fan or fan assembly itself, the described aspects do not require any space outside of the fan assembly, which eliminates the burden of relying upon or using a microcontroller which is outside of or external to the fan assembly itself or on a separate fan-external board.

Figure 2:
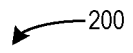
FIG. 2 illustrates an exemplary fan connector pinout for a fan which includes two pins configured for Inter-Integrated Circuit (I2C), in accordance with an aspect of the present application.

FIG. 2 illustrates an exemplary fan connector pinout 200 for a fan which includes two pins configured for I2C, in accordance with an aspect of the present application. Fan pinout 200 can indicate a pin position 202 and a pin function 204 for each of eight pins on an 8-pin pinout. Pin position 1 can be used for fan positive power (outlet), 12V, and pin position 2 can be used for fan positive power (inlet), 12V. Pin positions 3 and 4 can be used for I2C communication. For example, pin position 3 can be used to send power data to a system management (or other) entity using a serial data line (SDA) and pin position 4 can be used to receive signals to control the speed of the fan using a serial clock line (SCL). Pin position 5 can be used as a presence indicator, which indicates whether the fan has been physically installed in the server ("fan_install"). Pin position 6 can be used for a pulse width modulation (PWM) signal, e.g., a signal which can be asserted on pin 6 to control the speed at which the fan operates. In the described aspects, the system management entity can send a PWM signal to pin 6 to control the speed of the fan or can send a command or signal to the microcontroller to control the speed of the fan via the pins reserved for I2C communications (as described below in relation to FIGS. 3A and 3B). Pin position 7 can be used for fan power return (inlet), ground, and pin position 8 can be used for fan power return (outlet), ground. Other pinout designs and definitions may be used, with communications or signals relating to power data and fan information being transmitted to or received from the BMC/CPLD via the pins defined for I2C.

As depicted in FIG. 2, the described aspects can use two pins to monitor and capture information associated with fan faults, fan identification, and power monitoring/estimation. Fan 110 of FIG. 1A (and fans 150 and 160 of FIGS. 1B and 1C, respectively) can implement I2C using a hardened I2C engine in microcontroller 120 (e.g., I2C engine 128 in FIG. 1A). Fan 110 can support I2C access at 100 Kilohertz, and the I2C access can be unobtrusive, i.e., does not interfere with the standard operation of the fan when repeated I2C commands are sent in a short period of time. An address associated with fan 110 can be hard-coded to the fan (e.g., at a 0xB0 8-bit value), and the system or server can multiplex the I2C bus to avoid an address conflict. Furthermore, fan 110 can tolerate interrupted I2C transactions via a timeout related to the system management bus. Fan 110 (via microcontroller 120) can also reset the I2C interface if needed (e.g., if the interface or I2C engine experiences a failure or requires a reset).

In addition, the fan identification can be determined or performed via the I2C, which is an improvement to previously providing this 8-bit value via a dedicated pin. The described aspects can thus provide or allow for more information to be transmitted using a limited number of pins, which can result in reduction in pin usage, e.g., as compared to transmission of data relating to rotor faults, which previously used discrete pins.

Figure 3A:
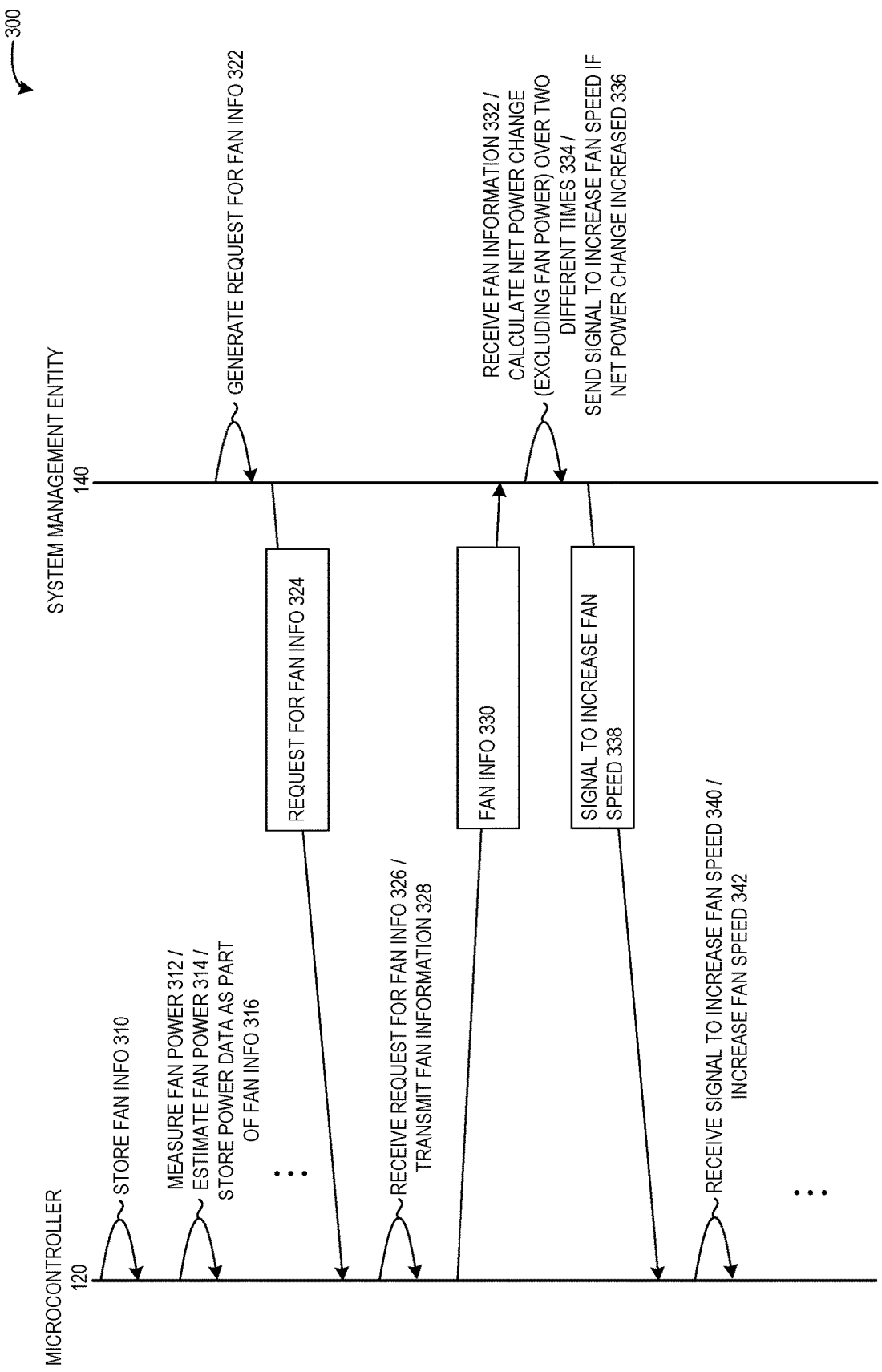
FIG. 3A illustrates communications which facilitate fan enhancements to improve server quality and performance, in accordance with an aspect of the present application.

FIG. 3A illustrates communications 300 which facilitate fan enhancements to improve server quality and performance, in accordance with an aspect of the present application. During operation, microcontroller 120 and system management entity 140 can communicate with each other and can also perform various functions. Microcontroller 120 can store fan information, such as manufacturing information, fan type, and power data, as described above (operation 310). Microcontroller 120 can also measure the fan power (operation 312, as depicted above in relation to power-measuring module 122), estimate the fan power (operation 314, as depicted above in relation to power-estimating module 124), and store this power data as part of the fan information (operation 316). System management entity 140 can generate a request for the fan information (operation 322) and can send request for fan information 324 to microcontroller 120.

Microcontroller 120 can receive the request for fan information (operation 326), and determine and transmit requested fan information 330 to system management entity 140 (operation 328). The requested fan information 330 can be for any of the information stored by microcontroller 120, including power data associated with a particular time period or time intervals. System management entity 140 can receive the requested fan information (operation 332) and control the fan speed to properly and efficiently cool the server by calculating the net power change over two different times (operation 334). The net power change at a given time can represent a difference between a total system power at the given time and the amount of power consumed by the fan at the given time. That is, the net power change can be calculated to indicate the amount of power consumed by the system or server in which the fan is installed, excluding or not including the power consumed by the fan itself. If the net power change over two different times, e.g., at a two-second interval, is greater than a certain predetermined threshold, system management entity 140 can send a signal to increase the fan speed (operation 336), sent as signal 338. If the net power change over the two different times is the same or less than the certain predetermined threshold, system management entity 140 can send no signal or a signal to decrease the fan speed (as described below in relation to FIG. 3B).

Microcontroller 120 can receive signal to increase fan speed 338 (operation 340) and increase the fan speed (operation 342) (e.g., by sending a signal to motor 138 associated with fan assembly 110 to increase the current fan speed). The described aspects can use various algorithms to determine the certain amount or value by which to increase the fan speed based on the amount of calculated net power or net power change, e.g., based on a linear ramp or other method. Operations 322-342 may continue during the operation of the fan.

While FIG. 3A indicates that microcontroller 120 performs operation 328 (i.e., sending fan information to system management entity 140) based on 322-326 (i.e., in response to a request from system management entity 140), in some aspects, microcontroller 120 may perform operation 328 and send the fan information to system management entity 140 automatically or based on a predetermined time or time interval.

Figure 3B:
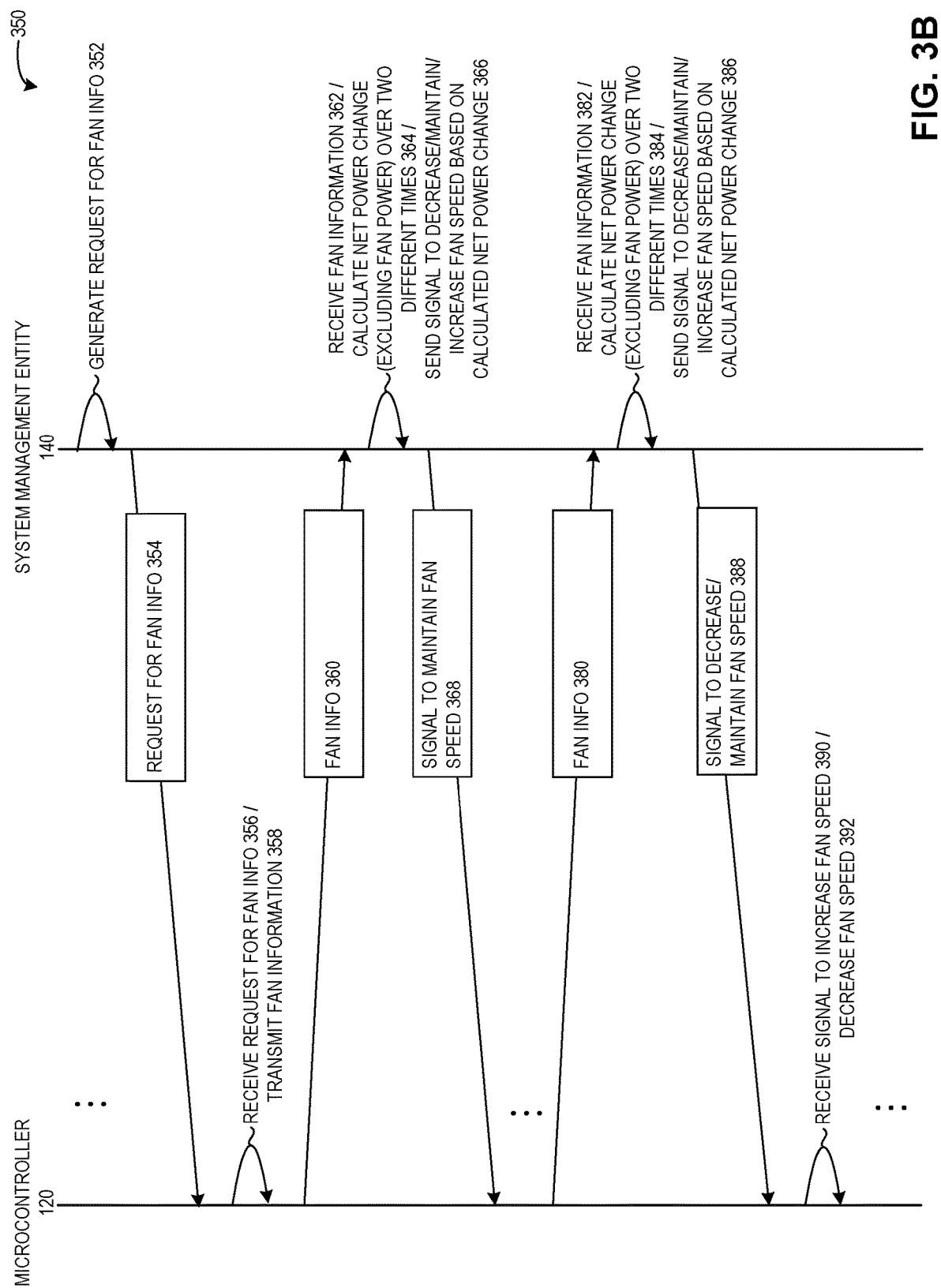
FIG. 3B illustrates communications which facilitate fan enhancements to improve server quality and performance, in accordance with an aspect of the present application.

FIG. 3B illustrates communications 350 which facilitate fan enhancements to improve server quality and performance, in accordance with an aspect of the present application. During operation, and in some aspects subsequent to the operations depicted in FIG. 3A, system management entity 140 can generate a request for the fan information (operation 352) and can send request for fan information 354 to microcontroller 120. Microcontroller 120 can receive the request for fan information (operation 356) and determine and transmit the requested fan information 360 to system management entity 140 (operation 358).

System management entity 140 can receive the requested fan information (operation 362) and control the fan speed to properly and efficiently cool the server by calculating the net power change over two different times (operation 364). If the net power change over two different times is not greater than the certain predetermined threshold, system management entity 140 can send a signal to maintain the fan speed (operation 366), sent as signal 368. In some aspects, if the net power change over the two different times is not greater than the certain predetermined threshold, system management entity 140 does not send any signal at all, which can result in maintaining or continuing the operation of the fan at the current fan speed.

As described above, microcontroller 120 can automatically transmit the requested fan information to system management entity 140 as fan information 380. System management entity 140 can receive the fan information (operation 382) and control the fan speed to properly and efficiently cool the server by calculating the net power change over two different times (operation 384). If the net power change over two different times is lower than a second predetermined threshold, system management entity 140 can send a signal to decrease the fan speed (operation 386), sent as signal 388.

Microcontroller 120 can receive signal to decrease fan speed 388 (operation 390) and decrease the fan speed (operation 392) (e.g., by sending a signal to motor 138 associated with fan assembly 110 to decrease the current fan speed).

Figure 4A:
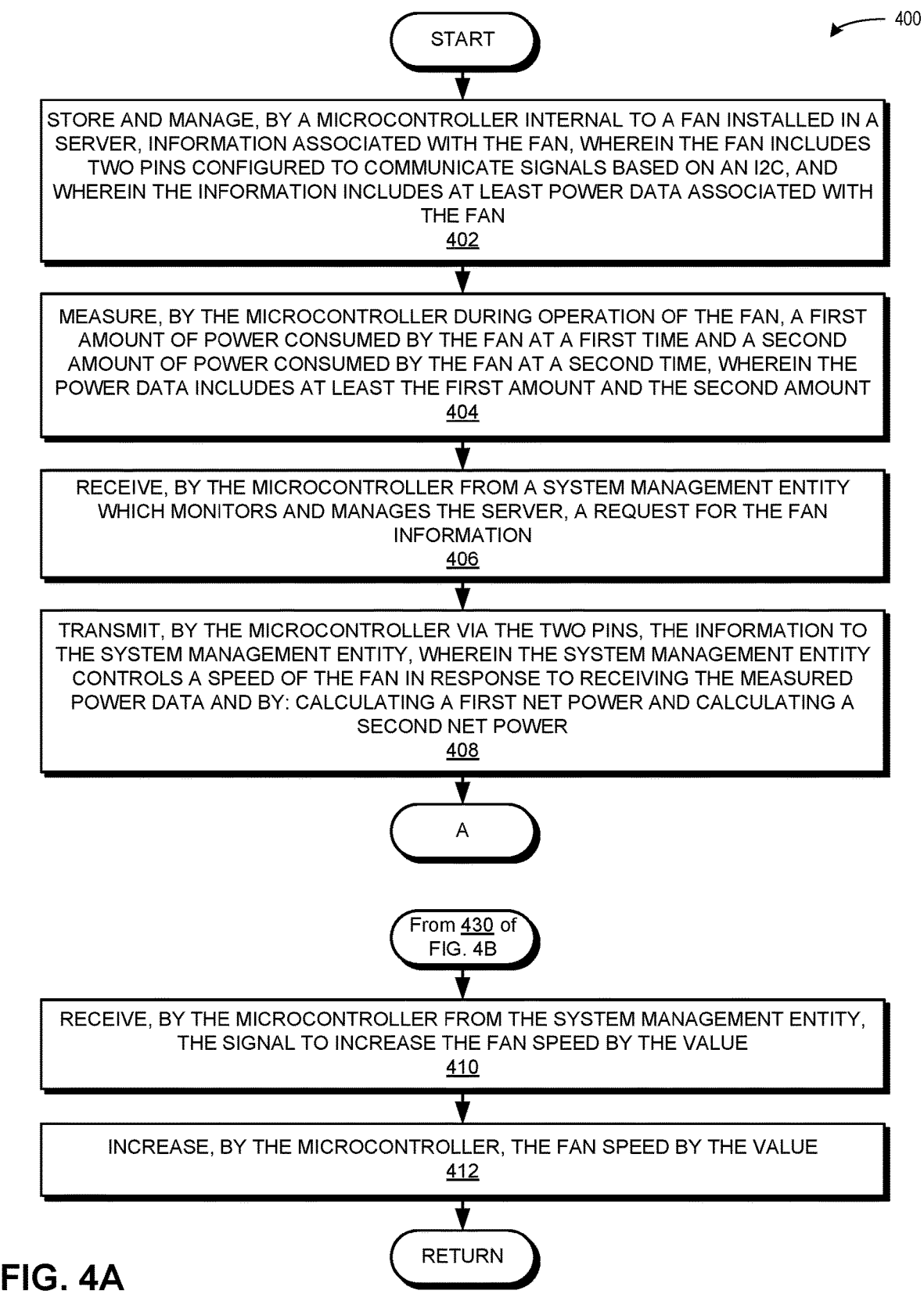
FIG. 4A presents a flowchart illustrating a method which facilitates fan enhancements to improve server quality and performance, in accordance with an aspect of the present application.

FIG. 4A presents a flowchart 400 illustrating a method which facilitates fan enhancements to improve server quality and performance, in accordance with an aspect of the present application. During operation, the system stores and manages, by a microcontroller internal to a fan installed in a server, information associated with the fan, wherein the fan includes two pins configured to communicate signals based on an inter-integrated circuit (I2C), and wherein the information includes at least power data associated with the fan (operation 402). The system measures, by the microcontroller during operation of the fan, a first amount of power consumed by the fan at a first time and a second amount of power consumed by the fan at a second time, wherein the power data includes at least the first amount and the second amount (operation 404). The system (optionally) receives, by the microcontroller from a system management entity which monitors and manages the server, a request for the fan information (operation 406). In some aspects, the system can perform operation 408 automatically, e.g., based on a predetermined time interval, instead of in response to a request for the fan information (as in operation 406).

The system transmits, by the microcontroller via the two pins, the information to the system management entity, wherein the system management entity controls a speed of the fan in response to receiving the measured power data and by: calculating a first net power (by determining a difference between a total amount of power consumed by the server at the first time and the first amount of power consumed by the fan at the first time) and calculating a second net power (by determining a difference between a total amount of power consumed by the server at the second time and the second amount of power consumed by the fan at the second time) (operation 408). The operation continues at Label A of FIG. 4B.

In some aspects, as part of operation 408, the microcontroller can transmit the fan information to the BMC or CPLD, which can receive and store the fan information for subsequent use, e.g., by a user on location with the fan installed in the server for configuration of the fan in a factory or data center.

Figure 4B:
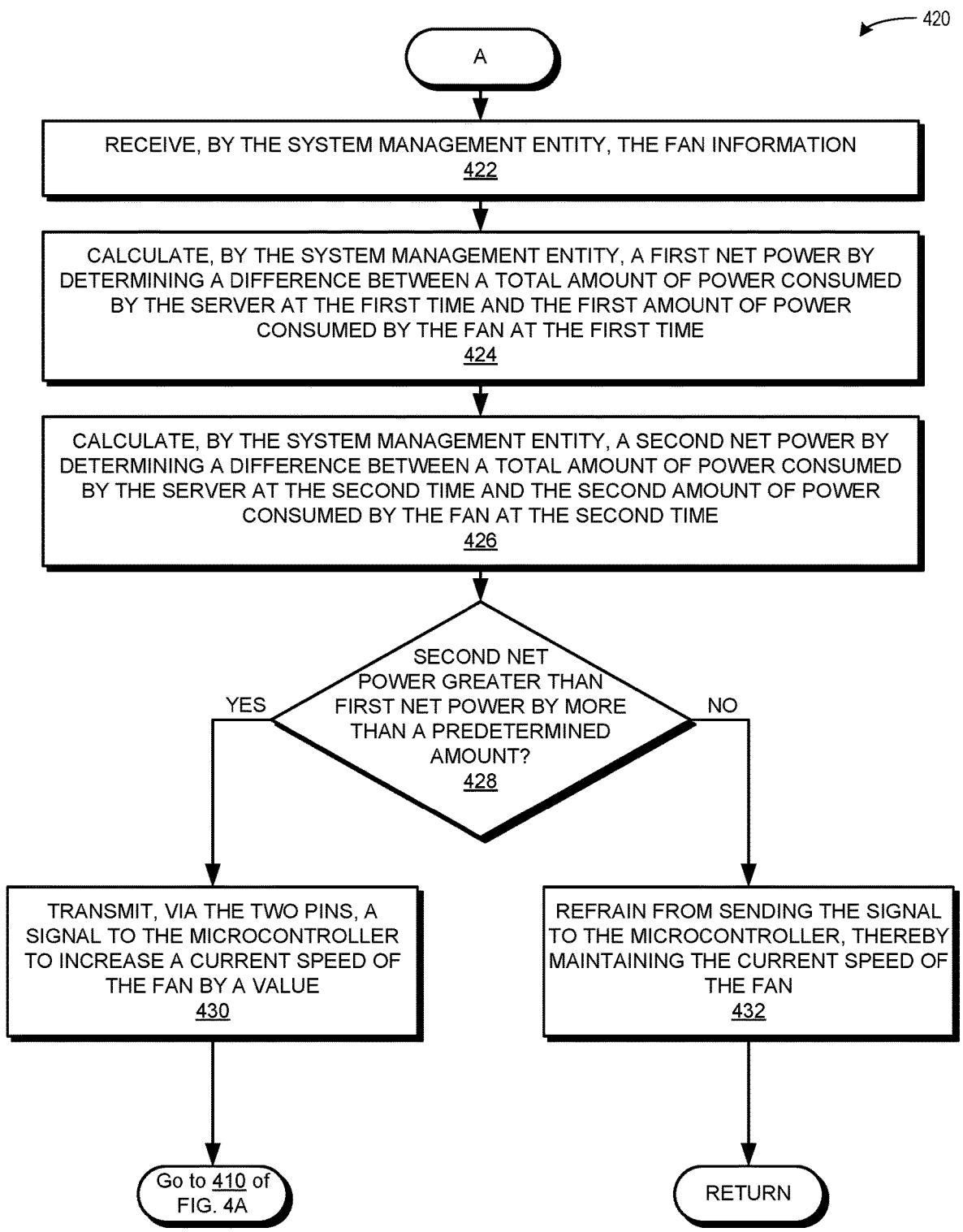
FIG. 4B presents a flowchart illustrating a method which facilitates fan enhancements to improve server quality and performance, in accordance with an aspect of the present application.

FIG. 4B presents a flowchart 420 illustrating a method which facilitates fan enhancements to improve server quality and performance, in accordance with an aspect of the present application. The system receives, by the system management entity, the fan information (operation 422). The system calculates a first net power by determining a difference between a total amount of power consumed by the server at the first time and the first amount of power consumed by the fan at the first time (operation 424), and the system calculates a second net power by determining a difference between a total amount of power consumed by the server at the second time and the second amount of power consumed by the fan at the second time (operation 426).

If the second net power is not greater than the first net power by more than a predetermined amount (decision 428), the system refrains from sending the signal to the microcontroller, thereby maintaining the current speed of the fan (operation 432), and the operation returns. If the second net power is greater than the first net power by more than a predetermined amount (decision 428), the system transmits, via the two pins, a signal to the microcontroller to increase a current speed of the fan by a value (operation 430), and the operation continues at operation 410 of FIG. 4A. Returning to FIG. 4A, the system receives, by the microcontroller from the system management entity, the signal to increase the fan speed by the value (operation 410), and the microcontroller increases the fan speed by the value (operation 412). The operation returns.

The described aspects allow the system to subtract the fan power from the total system power to ensure that the fan speed is increased only when the increase to the system power is from the system or system components which do not include the fan, as described above in relation to FIGS. 3A, 3B, and 4B. The system can provide this information to customers via the BMC/CPLD. Because no additional real estate or additional external board is required, the described aspects can result in a cost-effective manner of reporting fan power to customers or other users.

The system can also provide static information about the fan itself, such as the fan manufacture/type information relating to, e.g., the manufacturer, a lot number, a serial number, a date of manufacture, a type of the fan, and a vendor. As described above, a prior solution blocks or reserves the top 10% of the PWM range for transmitting the fan information, which places a limit on the fan speed at only 90% of its capability. In addition, using the PWM signal as a high polling rate monitor can occupy the PWM signal for a certain amount of time, which eliminates the use of PWM during this time by the BMC for fan control. By transmitting information via I2C from the fan-internal microcontroller, the described aspects allow for use of the entire range of the fan speed and do not limit the PWM signal.

Furthermore, the microcontroller may be coded with a manufacturing date which does not match the actual fan manufacturing date, which may create a gap when attempting to identify a certain lot of fans with issues. The described aspects can eliminate this potential mismatch by transmitting the relevant microcontroller and fan information via I2C.

By providing information regarding the type of fan, the system can provide information to a customer/end user to identify and differentiate between different types of fans installed in each fan bay (e.g., single rotor, dual rotor, standard fan, or performance fan) and can also identify a third type of fan if needed (e.g., 4056 mm standard, 4056 mm performance, or 4028 mm, as required on certain platforms based on space limitations). This fan type information can be used, for example, by a diagnostics team in the factory to ensure that the correct configuration for fan installation has been met prior to shipping the fan from the factory.

As described above, the fan or fan assembly itself (via its fan-internal microcontroller) can perform its own monitoring and/or estimation, via power-monitoring by actual measurement and power-estimating based on fan speed, fan commutation, back pressure, and rotations per minutes (e.g., as determined from a tachometer). This can result in preemptively increasing the speed of the fan, which can provide more precise control than relying on temperature data for increasing the speed of the fan.

The described aspects can also provide improvements to the customer/user experience and provide a root of trust for authentication. For example, a customer or end user can obtain and analyze the fan speed more easily because fan speed information (e.g., as obtained from a tachometer) can be sent via I2C. As another example, a customer or server can verify whether an installed fan has been properly authenticated and is not improperly installed, which can prevent unauthorized or malicious activities or incorrect fan usage in the field. Moreover, firmware on the microcontroller can be upgraded from a remote location, which can result in more efficient and flexible operations for changes to the fan once the fan has been shipped from the original factory and is on site and in operation. These improvements to enhance the customer/user experience can be provided by the system with minimal to no increase in the cost of the fan itself.

Figure 5:
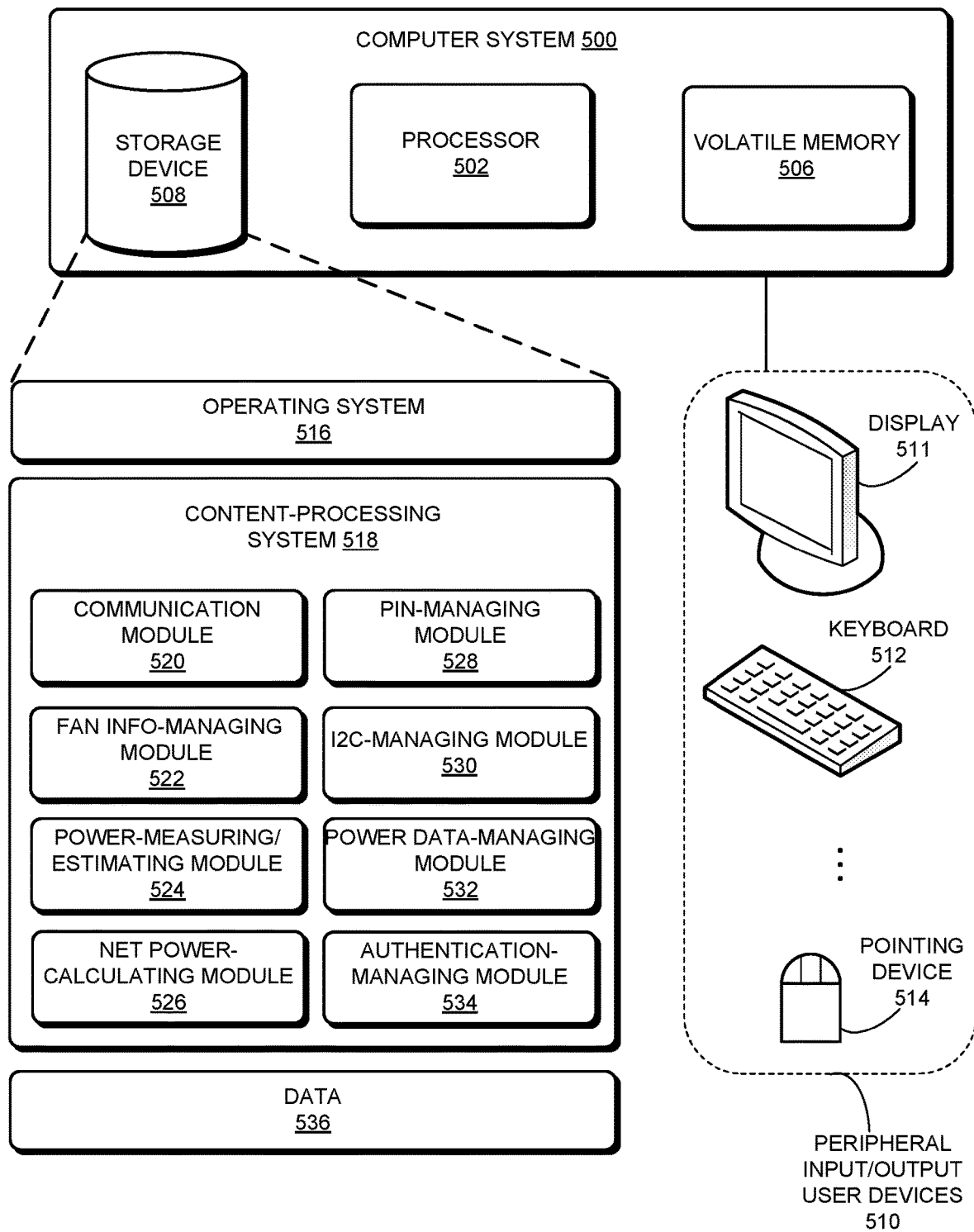
FIG. 5 illustrates a computer system which facilitates fan enhancements to improve server quality and performance, in accordance with an aspect of the present application.

FIG. 5 illustrates a computer system which facilitates fan enhancements to improve server quality and performance, in accordance with an aspect of the present application. Computer system 500 includes a processor 502, a volatile memory 506, and a storage device 508. Volatile memory 506 can include, e.g., random access memory (RAM), that serves as a managed memory, and can be used to store one or more memory pools. Storage device 508 can include persistent storage which can be managed or accessed via processor 502. Furthermore, computer system 500 can be coupled to peripheral input/output (I/O) user devices 510, e.g., a display device 511, a keyboard 512, and a pointing device 514. Storage device 508 can store an operating system 516, a content-processing system 518, and data 536. Computer system 500 can be a server which includes modules 520-534. Modules 520-534 can include hardware and programming with instructions which are executable by a processing resource of computer system 500. Computer system 500 may include fewer or more modules than modules 520-534 as shown in FIG. 5.

Content-processing system 518 can include instructions, which when executed by computer system 500, can cause computer system 500 or processor 502 to perform methods and/or processes described in this disclosure. Specifically, content-processing system 518 can include instructions for receiving and transmitting data packets, signals, and fan information (communication module 520).

Content-processing system 518 can further include instructions for managing, by a microcontroller internal to a fan installed in a server, information associated with the fan, wherein the fan includes two pins configured to communicate signals based on an inter-integrated circuit (I2C), and wherein the information includes at least power data associated with the fan (fan info-managing module 522). Content-processing system 518 can include instructions for measuring, by the microcontroller during operation of the fan, a first amount of power consumed by the fan at a first time and a second amount of power consumed by the fan at a second time, wherein the power data includes at least the first amount and the second amount (power-measuring/estimating module 524). Content-processing system 518 can also include instructions for transmitting, by the microcontroller via the two pins, the information to a system management entity (I2C-managing module 530) which monitors and manages the server, wherein the system management entity controls a speed of the fan in response to receiving the measured power data and by: calculating a first net power by determining a difference between a total amount of power consumed by the server at the first time and the first amount of power consumed by the fan at the first time; and calculating a second net power by determining a difference between a total amount of power consumed by the server at the second time and the second amount of power consumed by the fan at the second time (net power-calculating module 526).

Content-processing system 518 can additionally include instructions for measuring the power data, including the first amount and the second amount, by estimating an amount of power consumed by the fan based on at least one of: a speed of the fan; electronically commutated voltages; rotations per minute; and an amount of back pressure (power-measuring/estimating module 524). Content-processing system 518 can include instructions for managing the plurality of pins configured to communicate signals during operation of the fan (pin-managing module 528). Content-processing system 518 can also include instructions for determining whether a net power at a given time is greater than a net power at another time (power data-managing module 532). Content-processing system 518 can include instructions for receiving a request for authentication information corresponding to the fan and for transmitting the authentication information (authentication-managing module 534).

Data 536 can include any data that is required as input or generated as output by the methods and/or processes described in this disclosure. Specifically, data 536 can store at least one or more of the following: information associated with a fan; power data associated with a fan; an amount of power consumed by a fan at a given time; a measured amount of power consumed by a fan; an identifier or indicator of a microcontroller, a system management entity, a BMC, or a CPLD; an indicator of a plurality of pins; a definition for a fan connector pinout; an indicator of a pin configured for I2C communications; a net power; a difference; a total amount of system power; an amount of power consumed by a server at a given time; an amount of power consumed by a fan at a given time; a first amount; a second amount; a difference between the server power consumed and the fan power consumed at a given time; a request; a response; a predetermined time interval; manufacturing information; a type of the fan; data obtained from one or more sensors; data associated with operation of a fan relating to current, voltage, temperature, RPMs, fan speed, electronically commutated voltages, or back pressure; a predetermined amount; a value; authentication information; and an indicator of whether a fan is authenticated for installation in a server.

In general, the disclosed aspects provide a system for facilitating fan enhancements to improve server performance and quality. In one aspect, during operation, the system manages, by a microcontroller internal to a fan installed in a server, information associated with the fan, wherein the fan includes two pins configured to communicate signals based on an inter-integrated circuit (I2C), and wherein the information includes at least power data associated with the fan. The system measures, by the microcontroller during operation of the fan, a first amount of power consumed by the fan at a first time and a second amount of power consumed by the fan at a second time, wherein the power data includes at least the first amount and the second amount. The system transmits, by the microcontroller via the two pins, the information to a system management entity which monitors and manages the server, wherein the system management entity controls a speed of the fan in response to receiving the measured power data and by: calculating a first net power by determining a difference between a total amount of power consumed by the server at the first time and the first amount of power consumed by the fan at the first time; and calculating a second net power by determining a difference between a total amount of power consumed by the server at the second time and the second amount of power consumed by the fan at the second time.

In a further variation on this aspect, the fan includes a plurality of pins configured to communicate signals during operation of the fan.

In a further variation on this aspect, the plurality of pins include: the two pins, which are configured to communicate signals between the microcontroller and the system management entity based on the I2C; a third pin which indicates whether the fan is installed; and a fourth pin which receives a pulse width modulated (PWM) signal.

In a further variation on this aspect, transmitting the information to the system management entity is responsive to receiving a request from the system management entity for the information.

In a further variation, transmitting the information to the system management entity is based on a predetermined time interval.

In a further variation, the information associated with the fan further includes manufacturing information associated with the fan and a type of the fan.

In a further variation, the microcontroller measures the power data, including the first amount of power and the second amount of power, at predetermined time intervals and based on data obtained from one or more sensors of the fan.

In a further variation, the one or more sensors are configured to obtain data associated with operation of the fan relating to at least one of: current; voltage; temperature; and rotations per minute.

In a further variation, the microcontroller measures the power data, including the first amount and the second amount, by estimating an amount of power consumed by the fan based on at least one of: a speed of the fan; electronically commutated voltages; rotations per minute; and an amount of back pressure.

In a further variation, the system management entity controls the speed of the fan further by: responsive to determining that the second net power is greater than the first net power by more than a predetermined amount, transmitting, via the two pins, a signal to the microcontroller to increase a current speed of the fan by a value; and responsive to determining that the second net power is not greater than the first net power by more than the predetermined amount, refraining from sending the signal to the microcontroller, thereby maintaining the current speed of the fan.

In a further variation, the system receives, by the microcontroller from the system management entity via the two pins, a request for authentication information corresponding to the fan. The system transmits, by the microcontroller via the two pins to the system management entity, the authentication information corresponding to the fan, wherein the system management entity uses the authentication information to verify whether the fan is authenticated for installation in the server.

In a further variation, the system management entity is at least one of: a baseboard management controller; and a complex programmable logic device.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method, comprising:
    managing, by a microcontroller internal to a fan installed in a server, information associated with the fan, wherein the fan includes two I2C pins configured to communicate signals based on an inter-integrated circuit (I2C) protocol, and wherein the information includes at least power data associated with the fan;
    measuring, by the microcontroller during operation of the fan, a first amount of power consumed by the fan at a first time and a second amount of power consumed by the fan at a second time, wherein the power data includes at least the first amount and the second amount; and
    transmitting, by the microcontroller via the I2C pins, the information to a system management entity which monitors and manages the server, wherein the system management entity controls a speed of the fan in response to receiving the measured power data and by:
        calculating a first net power by determining a difference between a total amount of power consumed by the server at the first time and the first amount of power consumed by the fan at the first time;
        calculating a second net power by determining a difference between a total amount of power consumed by the server at the second time and the second amount of power consumed by the fan at the second time;
        comparing the first net power to the second net power; and
        controlling the speed of the fan based on the comparison of the first net power and the second net power by transmitting, via the I2C pins, a speed control signal to the microcontroller.

2. The method of claim 1, wherein transmitting the information to the system management entity is performed responsive to at least one of: receiving a request from the system management entity for the information and a predetermined time interval expiring.

3. The method of claim 1, wherein the information associated with the fan further includes manufacturing information associated with the fan and a type of the fan.

4. The method of claim 1, wherein measuring the power data, including the first amount of power and the second amount of power, comprises measuring, by the microcontroller, the power data at predetermined time intervals and based on data obtained from one or more sensors of the fan.

5. The method of claim 4, wherein measuring the power data comprises causing the one or more sensors to obtain data associated with operation of the fan relating to at least one of:
    current;
    voltage;
    temperature; and
    rotations per minute.

6. The method of claim 1, wherein measuring the power data, including the first amount and the second amount, comprises causing the microcontroller to estimate by estimating an amount of power consumed by the fan based on at least one of:
    a speed of the fan;
    electronically commutated voltages;
    rotations per minute; and
    an amount of back pressure.

7. The method of claim 1, wherein the system management entity controls the speed of the fan further by:
    responsive to determining that the second net power is greater than the first net power by more than a predetermined amount, configuring the fan speed control signal transmitted to the microcontroller to cause an increase a current speed of the fan by a value; and
    responsive to determining that the second net power is not greater than the first net power by more than the predetermined amount, refraining from sending the fan speed control signal to the microcontroller, thereby maintaining the current speed of the fan.

8. The method of claim 1, further comprising:
    receiving, by the microcontroller from the system management entity via the two pins, a request for authentication information corresponding to the fan;
    transmitting, by the microcontroller via the two pins to the system management entity, the authentication information corresponding to the fan, wherein the system management entity uses the authentication information to verify whether the fan is authenticated for installation in the server.

9. The method of claim 1, wherein the system management entity is at least one of:
    a baseboard management controller; and
    a complex programmable logic device.

10. A computer system comprising:
    a processor;
    a system management entity configured to monitor and manage the computer system; and
    one or more fans, each comprising:
        a plurality of blades residing in a casing;
        one or more sensors;
        a plurality of pins configured to communicate signals during operation of the fan, the plurality of pins including two I2C pins configured to communicate using an inter-integrated circuit (I2C) protocol; and
        a microcontroller residing within the casing, wherein the microcontroller is configured to:
            manage fan information associated with the fan, wherein the fan information includes at least fan power data associated with the fan;
            measure, based on outputs of the one or more sensors, power consumed by the fan at a first time and a second amount of power consumed by the fan at a second time, wherein the power data includes at least the first amount and the second amount; and
            transmit, via the I2C pins, at least the fan power data to the system management entity,
    wherein the system management entity is configured to:
        determine a first net power and a second net power based on the fan power data received from the one or more fans, the first net power being the power consumed by the computer system at the first time less the power consumed by the one or more fans at the first time, the second net power being the power consumed by the computer system at the first time less the power consumed by the one or more fans at the second time;

compare the first net power to the second net power; and control the respective speeds of the one or more fans based on the comparison of the first net power and the second net power by transmitting speed control signals to the respective microcontrollers of the one or more fans via the respective I2C pins of the one or more fans.

11. The computer system of claim 10, wherein, each of the one or more fans comprises a connector which includes the plurality of pins and the plurality of pins further include:

a third pin which indicates whether the fan is installed; and a fourth pin which receives a pulse width modulated (PWM) signal.

12. The computer system of claim 10, wherein, for each of the one or more fans, the microcontroller is further configured to transmit the fan information to the system management entity responsive to one or more of:

receiving a request from the system management entity for the fan information; and detecting a first predetermined time interval.

13. The computer system of claim 10, wherein, for each of the one or more fans, the microcontroller is further configured to:

measure the power data, including the first amount of power and the second amount of power, at predetermined time intervals.

14. The computer system of claim 10, wherein the information associated with the fan further includes manufacturing information associated with the fan and a type of the fan.

15. The computer system of claim 10, wherein, for each of the one or more fans, the one or more sensors are configured to obtain data associated with operation of the fan relating to at least one of:

current;
voltage;
temperature; and
rotations per minute.

16. The computer system of claim 10, wherein the system management entity controls the respective speeds of the one or more fans by:

responsive to determining that the second net power is greater than the first net power, transmitting the speed control signals configured to cause the one or more fans to increase their respective speeds; and responsive to determining that the second net power is less than the first net power, transmitting the speed control signals configured to cause the one or more fans to decrease their respective speeds.

17. The computer system of claim 16, wherein the system management entity controls the respective speeds of the one or more fans by:

responsive to determining that the second net power is greater than the first net power by more than a predetermined amount, transmitting the speed control signals configured to cause the one or more fans to increase their respective speeds;

responsive to determining that the second net power is less than the first net power by more than the predetermined amount, transmitting the speed control signals configured to cause the one or more fans to decrease their respective speeds; and responsive to determining that the second net power is within the predetermined amount from the first net power, causing the one or more fans to maintain their respective current speeds.

18. The computer system of claim 17, wherein causing the one or more fans to maintain their respective current speeds comprises refraining from transmitting the speed control signals.

19. The computer system of claim 10, wherein the system management entity is at least one of:

a baseboard management controller; and
a complex programmable logic device.

20. A non-transitory computer-readable storage medium storing instructions that are configured to, when executed by a system management entity of a computer system, cause the system management entity to:

receive power data from respective microcontrollers of one or more fans of the computer system via I2C pins of the fans, the I2C pins configured to communicate based on and inter-integrated circuit (I2C) protocol, wherein for each of the one or more fans the power data indicates power consumption amounts for the fan at various times including a first time and a second time;

calculate net powers based on the power data received from the one or more fans including a first net power and a second net power, wherein the first net power reflects a difference between a total amount of power consumed by the computer system at the first time and the amount of power consumed by the one or more fans at the first time, and the second net power reflects a difference between a total amount of power consumed by the computer system at the second time and the amount of power consumed by the one or more fans at the second time; and compare instances of the net powers to one another, including comparing the first net power to the second net power; and control the respective speeds of the one or more fans based on the comparisons of the instances of the net powers, by transmitting speed control signals to respective microcontrollers of the one or more fans via the respective I2C pins of the one or more fans.

* * * * *